(12) United States Patent
Uchibori (10) Patent No.: US 9,932,065 B2
(45) Date of Patent: Apr. 3, 2018

(54) STEERING DEVICE

(71) Applicant: Showa Corporation, Gyoda-shi (JP)

(72) Inventor: Hirotoshi Uchibori, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/234,644

(22) Filed: Aug. 11, 2016

(65) Prior Publication Data

US 2017/0197652 A1    Jul. 13, 2017

(30) Foreign Application Priority Data

Jan. 13, 2016  (JP) ................................ 2016-004513

(51) Int. Cl.
| | |
|---|---|
| *B62D 1/16* | (2006.01) |
| *B62D 5/04* | (2006.01) |
| *B62D 3/12* | (2006.01) |
| *B62D 5/00* | (2006.01) |
| *B62D 6/00* | (2006.01) |
| *B62D 6/10* | (2006.01) |
| *B62D 1/19* | (2006.01) |

(52) U.S. Cl.
CPC ........... *B62D 5/0409* (2013.01); *B62D 1/192* (2013.01); *B62D 3/12* (2013.01); *B62D 5/005* (2013.01); *B62D 5/0415* (2013.01); *B62D 5/0463* (2013.01); *B62D 6/008* (2013.01); *B62D 6/10* (2013.01)

(58) Field of Classification Search
CPC ........... B62D 1/192; B62D 1/19; B62D 1/195
USPC ................................. 180/444, 446; 280/777
See application file for complete search history.

(56) References Cited

U.S. PATENT DOCUMENTS

| | | | | |
|---|---|---|---|---|
| 6,099,036 A | * | 8/2000 | Fujiu .................... | B62D 1/192 280/777 |
| 6,339,970 B1 | * | 1/2002 | Blex ...................... | B62D 1/192 188/371 |
| 7,581,466 B2 | * | 9/2009 | Yoshioka ............... | B62D 1/192 280/775 |

(Continued)

FOREIGN PATENT DOCUMENTS

| | | |
|---|---|---|
| DE | 10033810 A | 1/2002 |
| DE | 10320846 A | 12/2004 |

(Continued)

OTHER PUBLICATIONS

Extended European Search Report dated Jun. 12, 2017 for the corresponding European Patent Application No. 16185905.3.

*Primary Examiner* — Tony H Winner
(74) *Attorney, Agent, or Firm* — Leason Ellis LLP (57) ABSTRACT

A steering device includes a motor, a first shaft, a transmitter, a second shaft, and an engagement portion. The first shaft of a hollow cylindrical shape is coupled in a torque transmittable manner to a steering member with which a driver performs steering operation. The transmitter is disposed on an outer circumference of the first shaft and configured to transmit torque of the motor to the first shaft. The second shaft is coupled in a torque transmittable manner to a wheel-turning unit configured to turn wheels. The second shaft is inserted in the first shaft. The engagement portion is interposed between an inner surface of the first shaft and an outer surface of the second shaft and configured to make the first shaft and the second shaft engage with each other.

20 Claims, 5 Drawing Sheets

(56) References Cited

U.S. PATENT DOCUMENTS

| | | | |
|---|---|---|---|
| 8,549,953 B2 * | 10/2013 | Schnitzer | B62D 1/185 280/775 |
| 2003/0227162 A1 * | 12/2003 | Ulintz | B62D 1/192 280/777 |
| 2004/0163879 A1 * | 8/2004 | Segawa | B62D 5/0409 180/444 |
| 2006/0191368 A1 * | 8/2006 | Sawada | B62D 1/181 74/495 |
| 2009/0256341 A1 * | 10/2009 | Okada | B62D 1/181 280/775 |
| 2015/0291204 A1 * | 10/2015 | Chiba | B62D 1/195 74/492 |

FOREIGN PATENT DOCUMENTS

| | | |
|---|---|---|
| DE | 102009017054 A | 10/2010 |
| EP | 1876083 A | 1/2008 |
| GB | 2161031 A | 1/1986 |
| JP | 2010-6323 A | 1/2010 |
| JP | 2011-98659 A | 5/2011 |
| WO | WO-2010/112512 A | 10/2010 |

* cited by examiner

STEERING DEVICE

CROSS-REFERENCE TO RELATED APPLICATIONS

The present application claims priority under 35 U.S.C. § 119 to Japanese Patent Application No. 2016-004513, filed Jan. 13, 2016. The contents of this application are incorporated herein by reference in their entirety.

BACKGROUND OF THE INVENTION

Field of the Invention
The present invention relates to a steering device.
Discussion of the Background
When a frontal collision (primary collision) of a vehicle occurs, the driver subsequently collides with the steering wheel, namely, a secondary collision occurs. Japanese Unexamined Patent Application Publication No. 2010-6323 and Japanese Unexamined Patent Application Publication No. 2011-98659 disclose a steering device including an impact absorbing mechanism to reduce an impact load on the driver from the steering wheel at the time of such a secondary collision.

SUMMARY OF THE INVENTION

According to the present invention, a steering device includes a motor, a first shaft, a transmitter, a second shaft, and an engagement portion. The first shaft of a hollow cylindrical shape is coupled in a torque transmittable manner to a steering member with which a driver performs steering operation. The transmitter is disposed on an outer circumference of the first shaft and configured to transmit torque of the motor to the first shaft. The second shaft is coupled in a torque transmittable manner to a wheel-turning unit configured to turn wheels. The second shaft is inserted in the first shaft. The engagement portion is interposed between an inner surface of the first shaft and an outer surface of the second shaft and configured to make the first shaft and the second shaft engage with each other.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Embodiment 1

A steering device 1 according to embodiment 1 will now be described with reference to FIGS. 1 to 4A and 4B, wherein like reference numerals designate corresponding or identical elements throughout the various drawings.

Figure 1:
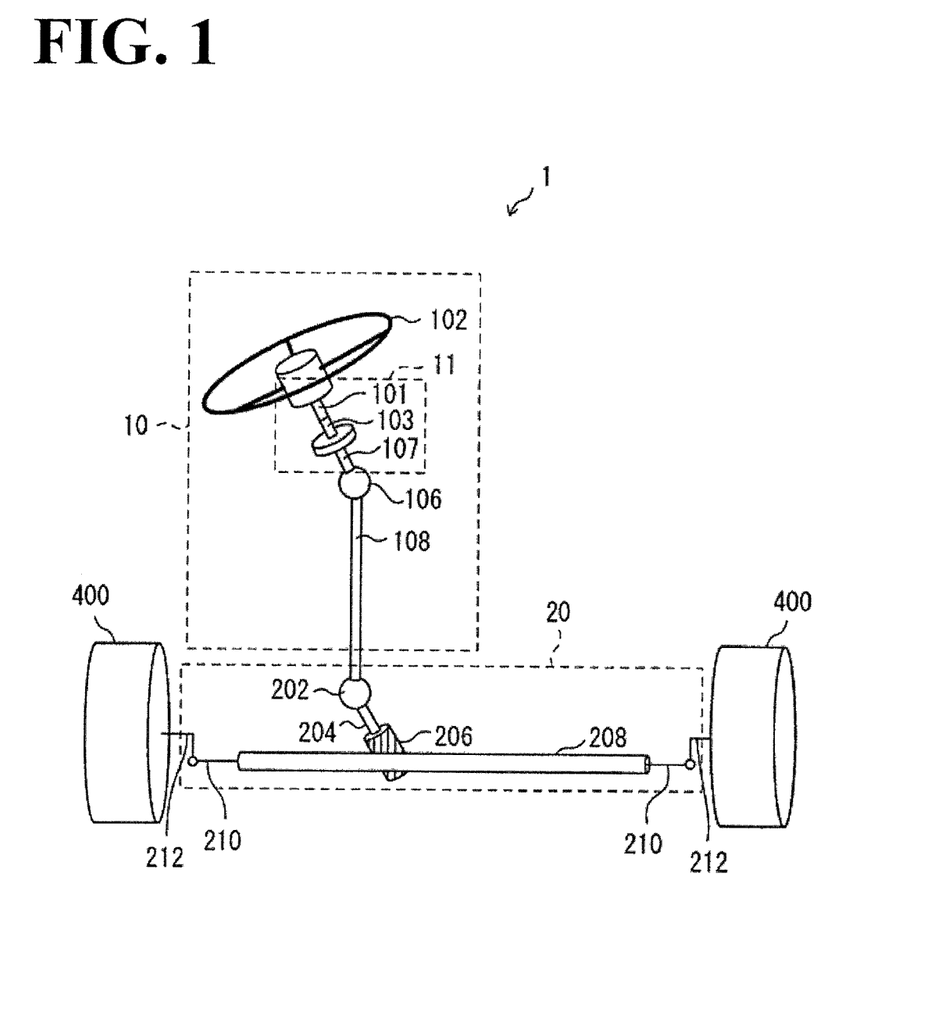
FIG. 1 is a diagram schematically illustrating an exemplary configuration of an essential part of a steering device according to embodiment 1.

FIG. 1 is a diagram schematically illustrating an exemplary configuration of an essential part of the steering device 1 according to embodiment 1. As illustrated in FIG. 1, the steering device 1 includes a steering unit 10, a wheel-turning unit 20, and a controller (not illustrated). The steering unit 10 accepts steering operation by the driver. In accordance with the steering operation accepted by the steering unit 10, the wheel-turning unit 20 turns wheels 400. In the steering device 1 in the following description, an electric power steering system (hereinafter referred to as EPS) is adopted to make the motor exert assist force. This, however, should not limit this embodiment. A steer-by-wire system may be adopted to mechanically connect and interrupt a torque transmission path between the steering unit 10 and the wheel-turning unit 20, and to electrically control a wheel-turning angle of the wheels 400 in accordance with the steering operation accepted by the steering unit 10 when the torque transmission path is interrupted.

Steering Unit 10

As illustrated in FIG. 1, the steering unit 10 includes a steering member 102, an upper steering shaft 101, an intermediate steering shaft (first shaft) 103, a lower steering shaft (second shaft) 107, a first universal joint 106, and an intermediate shaft 108. The steering member 102, the upper steering shaft 101, the intermediate steering shaft 103, and the lower steering shaft 107 are coupled to each other in a torque transmittable manner. Here, "coupled in a torque transmittable manner" refers to "coupled in such a manner that rotation of one member causes rotation of another member". In a non-limiting example, this at least includes when one member and another member are integral to each other, when one member is directly or indirectly secured to another member, and when one member and another member are coupled through, for example, a joint member so as to operate in conjunction with each other.

In this description, the upper steering shaft 101, the intermediate steering shaft 103, and the lower steering shaft 107 are included in a steering column 11, described later.

In this embodiment, the upper end of the upper steering shaft 101 is secured to the steering member 102 and integrally rotates with the steering member 102. The lower end of the lower steering shaft 107 and the upper end of the intermediate shaft 108 are coupled through the first universal joint 106 in such a manner that the lower steering shaft 107 and the intermediate shaft 108 operate in conjunction with each other.

In the description, "upper end" refers to an end at the upstream side in the transmission path of steering force in accordance with steering operation by the driver (namely, the end on the input side), and "lower end" refers to an end at the downstream side in the transmission path of steering force (namely, the end on the output side) (the same applies below).

As an example of the steering member 102, as illustrated in FIG. 1, an annular steering wheel is given. This, however, should not limit this embodiment. The steering member 102 may have a different shape and mechanism insofar as it is possible to accept steering operation by the driver.

Wheel-Turning Unit 20

The wheel-turning unit 20 is a configuration for turning the wheels 400 in accordance with steering operation by the driver accepted by the steering unit 10.

As illustrated in FIG. 1, the wheel-turning unit 20 includes a second universal joint (universal joint) 202, a pinion shaft (input shaft) 204, a pinion gear 206, a rack bar (wheel-turning shaft) 208, tie rods 210, and knuckle arms 212. The intermediate shaft 108, the pinion shaft 204, and the pinion gear 206 are coupled to each other in a torque transmittable manner.

In this embodiment, the pinion gear 206 is secured to the lower end of the pinion shaft 204 and integrally rotates with the pinion shaft 204. The lower end of the intermediate shaft 108 and the upper end of the pinion shaft 204 are coupled through the second universal joint 202 in such a manner that the intermediate shaft 108 and the pinion shaft 204 operate in conjunction with each other.

The rack bar 208 is a configuration for turning the wheels 400 in accordance with rotation of the pinion gear 206. Rack teeth (not illustrated) to mesh with the pinion gear 206 are formed on the rack bar 208.

In the steering device 1 of the above-described configuration, when the driver performs steering operation through the steering member 102, the pinion gear 206 rotates, and the rack bar 208 is displaced in the axial direction of the rack bar 208. Thus, through the tie rods 210 disposed on both ends of the rack bar 208 and the knuckle arms 212 coupled to the tie rods 210, the wheels 400 are turned.

In the example illustrated in FIG. 1, the configuration is adopted in which transmission of steering force between the pinion shaft 204 and the rack bar 208 is performed by the pinion gear 206 and the rack teeth. This, however, should not limit this embodiment. Other configurations may be adopted insofar as steering force can be transmitted between the pinion shaft 204 and the rack bar 208.

Figure 2A:
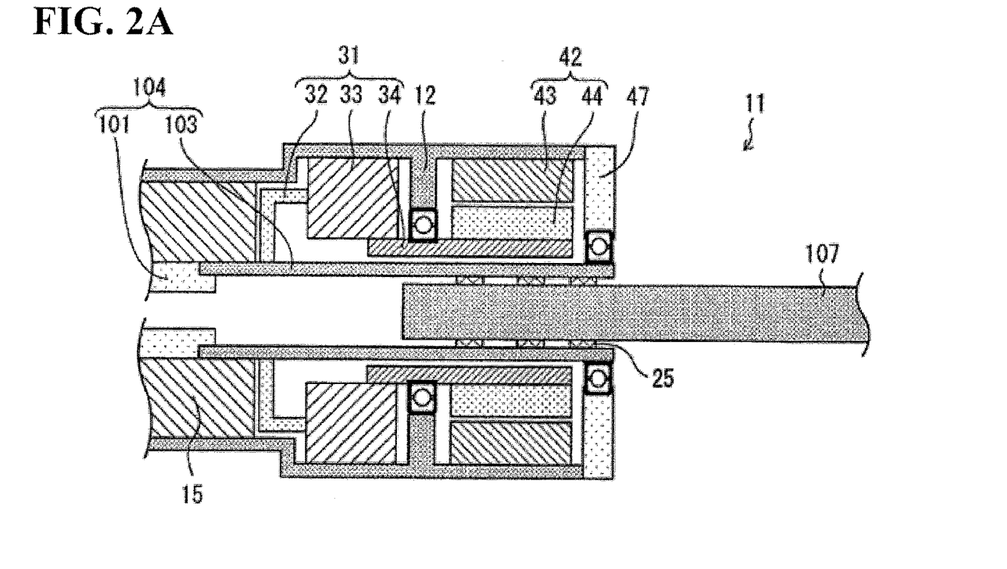
FIGS. 2A and 2B are cross-sectional views of a steering column illustrated in FIG. 1, schematically illustrating exemplary configurations of the steering column, of which FIG. 2A corresponds to a state before engagement portions are broken, and FIG. 2B corresponds to a state after the engagement portions are broken.
Figure 2B:
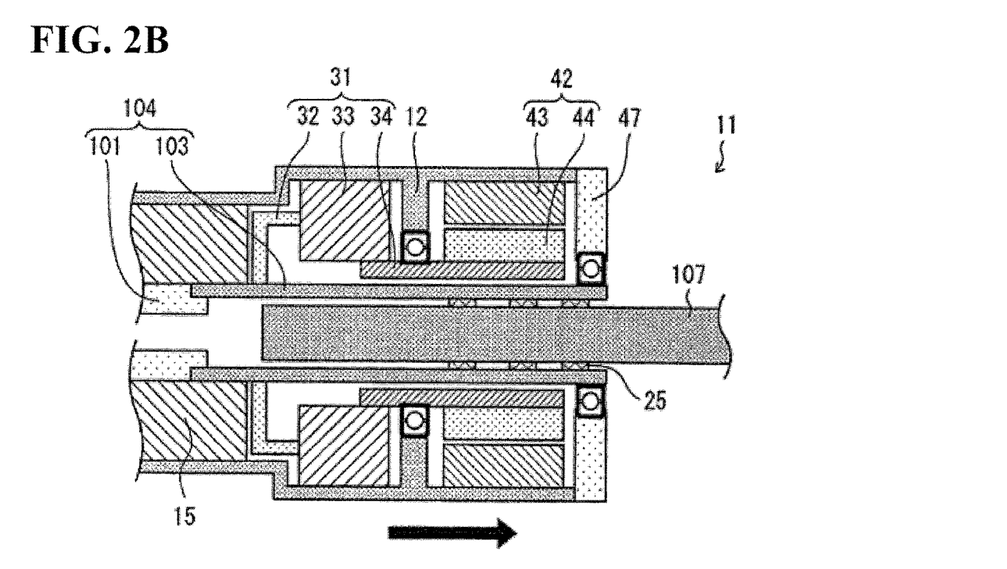

Next, the above-described steering column 11 will be specifically described. FIGS. 2A and 2B are cross-sectional views of the steering column 11 illustrated in FIG. 1, schematically illustrating an exemplary configuration of the steering column 11. FIG. 2A corresponds to a state before engagement portions, described later, are broken, and FIG. 2B corresponds to a state after the engagement portions are broken.

First, as illustrated in FIG. 2A, the steering column 11 includes a housing 12. The housing 12 accommodates part of the upper steering shaft 101, the intermediate steering shaft 103, a torque sensor 15, a transmitter 31, a motor 42, and part of the lower steering shaft 107. An end cover 47 is attached to an end portion of the housing 12 at the downstream side.

At least part of the upper steering shaft 101, and the intermediate steering shaft 103 have hollow cylindrical shapes. That is, the upper steering shaft 101 and the intermediate steering shaft 103 have hollows formed inside. A torsion bar (not illustrated) is disposed in the hollows to elastically couple the upper steering shaft 101 and the intermediate steering shaft 103 to each other.

In this description, the upper steering shaft 101 and the intermediate steering shaft 103 will be collectively referred to as column shaft 104. The column shaft 104 may be formed of the upper steering shaft 101 and the intermediate steering shaft 103 integral to each other. When the column shaft 104 is formed of the upper steering shaft 101 and the intermediate steering shaft 103 integral to each other, a hollow cylindrical portion of the column shaft 104 at the downstream side will be referred to as first shaft.

The torque sensor 15 detects torsion between the upper steering shaft 101 and the intermediate steering shaft 103.

More specifically, when the driver performs steering operation through the steering member 102, a torsion angle $\theta_T$ is formed between the upper steering shaft 101 and the intermediate steering shaft 103 in accordance with an amount of torque T of the steering operation. The torque sensor 15 detects the torsion angle $\theta_T$ formed in accordance with the amount of torque T of the steering operation. A result of detection by the torque sensor 15 is supplied to the controller (not illustrated) as a torque sensor signal. It is noted that the steering unit 10 (see FIG. 1) may include a steering angle sensor to detect a steering angle of the steering member 102 (see FIG. 1) so as to supply a signal indicating a detected steering angle or steering angle speed to the controller.

The transmitter 31 is disposed on the outer circumference of the intermediate steering shaft 103 in the axial direction and is a configuration for transmitting torque generated by the motor 42 to the intermediate steering shaft 103. The transmitter 31 includes a planetary support member 32, a planetary gear 33, and a motive-power transmission shaft 34. The planetary support member 32 is secured to the intermediate steering shaft 103 and supports the planetary gear 33 in such a manner that the planetary gear 33 rotates on its axis. The transmitter 31 also includes an internal gear (not illustrated) disposed on the inner circumference of the housing 12. The planetary gear 33 meshes with the internal gear.

The configuration of the transmitter 31 should not be limited to the example described above. A combination of a worm wheel and a worm gear, a combination of a pinion gear and a pinion gear, and a combination of a helical gear and a helical gear may be adopted. Alternatively, a traction drive method or a friction drive method may be adopted, and a planetary roller may be used in place of the planetary gear 33. Alternatively, a belt drive method or a chain drive method may be adopted.

Other than the above-described elements, the transmitter 31 may include at least one of a housing (integral to or separate from the housing 12), a bearing, and the end cover 47 described above.

In this embodiment, the transmitter 31 has a configuration as a reduction gear to reduce the speed of rotation of the output shaft of the motor 42 and transmit the rotation to the intermediate steering shaft 103. This, however, should not limit the present invention. The transmitter 31 may transmit rotation of the output shaft of the motor 42 to the intermediate steering shaft 103 without reducing the rotation in speed.

The motor 42 has a configuration as a brushless motor including a stator 43 secured to the housing 12 and a magnet 44 secured to the motive-power transmission shaft 34. In the present invention, however, the motor 42 should not be limited to this configuration. For example, the motor 42 may have a configuration in which the arrangement of the stator 43 and the magnet 44 is reversed.

In this embodiment, the lower steering shaft 107 is coupled to the wheel-turning unit 20 (see FIG. 1) to turn the wheels 400 (see FIG. 1) in a torque transmittable manner. The lower steering shaft 107 is inserted in the intermediate steering shaft 103 of a hollow cylindrical shape.

The engagement portions 25 are interposed between the inner surface of the intermediate steering shaft 103 and the outer surface of the lower steering shaft 107. The engagement portions 25 make the intermediate steering shaft 103 and the lower steering shaft 107 engage with each other to mainly prevent the intermediate steering shaft 103 and the lower steering shaft 107 from moving relative to each other in the axial direction. The engagement portions 25 are formed of, for example, resin. When receiving force of a predetermined magnitude or more that has a component in the axial direction of the column shaft 104, the engagement portions 25 are broken.

According to this embodiment with the above-described configuration, therefore, when the engagement portions 25 in the state illustrated in FIG. 2A receive force of the predetermined magnitude or more that has the component in the axial direction of the column shaft 104, the engagement portions 25 are broken to release the engagement between the column shaft 104 and the lower steering shaft 107. This makes the lower steering shaft 107 movable in the hollow inside of the column shaft 104 in the axial direction. For example, when a second collision, described later, occurs, force toward the downstream side of the column shaft 104 in the axial direction is applied to the column shaft 104. Thus, as illustrated in FIG. 2B, the column shaft 104 and the housing 12 are displaced toward the downstream side of the lower steering shaft 107 in the axial direction.

Attachment of Steering Column 11 to Vehicle Body

Figure 3:
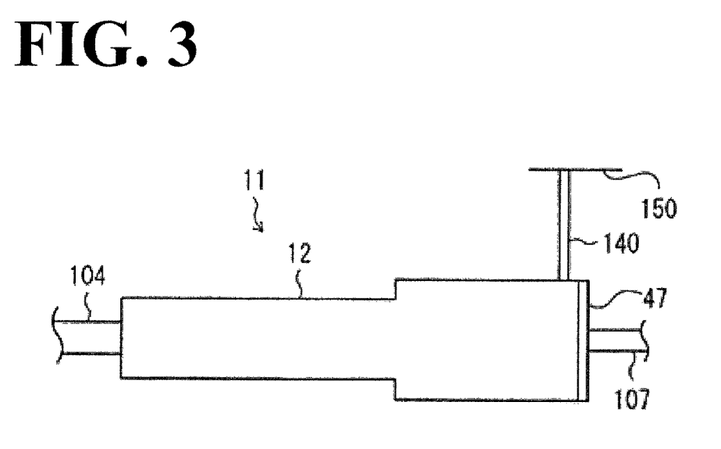
FIG. 3 is a diagram schematically illustrating an exemplary state in which the steering column illustrated in FIGS. 2A and 2B is attached to the body of a vehicle.

FIG. 3 is a diagram schematically illustrating an exemplary state in which the steering column 11 illustrated in FIGS. 2A and 2B is attached to the vehicle body.

As illustrated in FIG. 3, the housing 12 of the steering column 11 is attached to the body 150 through a support member 140.

In this embodiment, when the housing 12 receives the force that has the component in the axial direction of the column shaft 104, the support member 140 is deformed to displace the housing at least in the axial direction. In this embodiment, however, the support member 140 is not an essential configuration.

Function of Steering Column 11

Figure 4A:
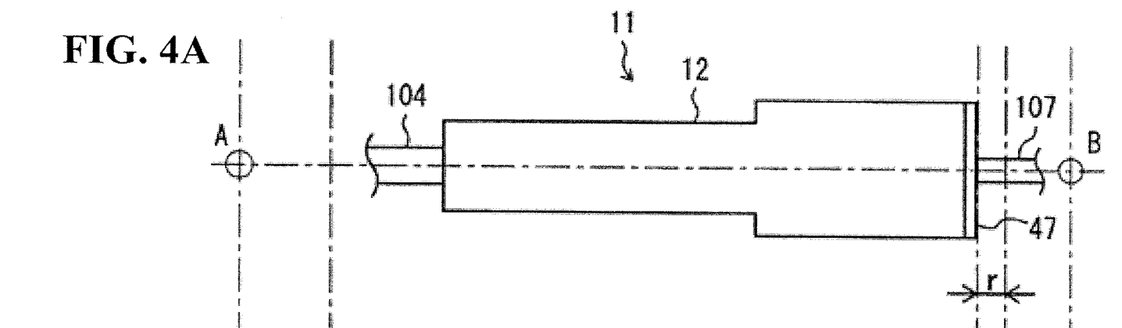
FIGS. 4A and 4B are diagrams schematically illustrating exemplary states of the steering column illustrated in FIG. 3 before and after a secondary collision, of which FIG. 4A corresponds to a state before the secondary collision, and FIG. 4B corresponds to a state after the secondary collision.
Figure 4B:
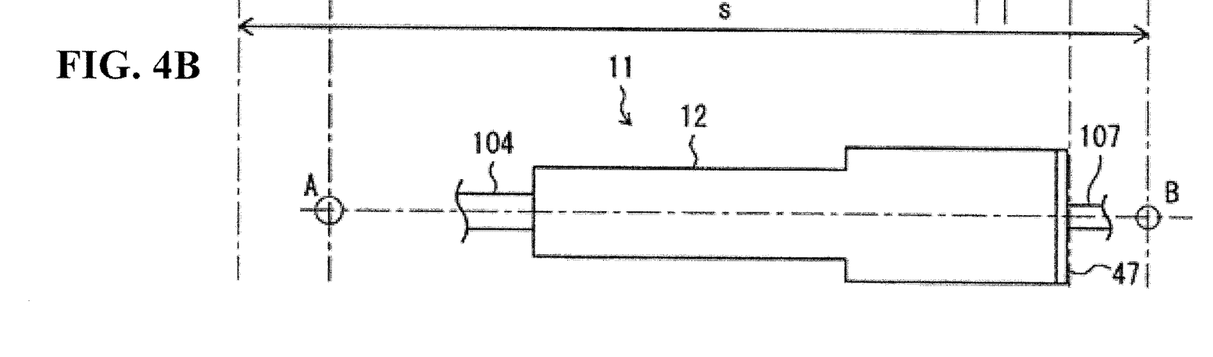

Next, the function of the steering column 11 will be specifically described by further referring to FIGS. 4A and 4B.

FIGS. 4A and 4B are diagrams schematically illustrating exemplary states of the steering column 11 illustrated in FIG. 3 before and after a second collision. FIG. 4A corresponds to a state before the second collision, and FIG. 4B corresponds to a state after the second collision. For ease of description, in FIGS. 4A and 4B, the support member 140 and the body 150 illustrated in FIG. 3 are omitted. In this description, a second collision refers to a collision of the driver with the steering wheel, namely, the steering member 102 illustrated in FIG. 1, after a frontal collision (primary collision) of the vehicle.

The steering column 11 attached to the body 150 (see FIG. 3) of the vehicle is normally in the state illustrated in FIG. 4A. As described above, the column shaft 104 and the lower steering shaft 107 engage with each other through the engagement portions 25 in the housing 12. That is, the column shaft 104 and the lower steering shaft 107 are in the state illustrated in FIG. 2A.

When a secondary collision occurs, however, force toward the downstream side of the column shaft 104 in the axial direction is applied to the column shaft 104. Then, the engagement portions 25 (see FIGS. 2A and 2B) are broken by this force to release the engagement between the column shaft 104 and the lower steering shaft 107. As a result, lower steering shaft 107 slides relatively in the hollow in the column shaft 104 toward the upstream side in the axial direction. Thus, at least part of the collision energy generated by the secondary collision is absorbed.

In this manner, according to this embodiment, space in the column shaft 104 is effectively utilized to absorb at least part of the force generated by the second collision inside of the steering column 11.

In the configuration including the support member 140, this force deforms the support member 140 to displace the steering column 11 from the position illustrated in FIG. 4A to the position illustrated in FIG. 4B in the axial direction. In other words, the steering column 11 moves forwardly. Thus, other part of the collision energy generated by the secondary collision is absorbed.

As illustrated in FIGS. 4A and 4B, a length from point A to point B, which is the overall length of the steering column 11 (hereinafter referred to as "length AB"), is a length "r" (see FIG. 4A) shorter after the secondary collision than before the secondary collision.

Consequently, in order to move the steering column 11 in consideration of the secondary collision, it suffices insofar as a space of a length "s" (see FIGS. 4A and 4B) in the axial direction of the steering column 11 is secured. The length "s" is the length "r" described above shorter than a configuration in which the lower steering shaft 107 does not slide in the column shaft 104 relatively.

According to embodiment 1, therefore, the space corresponding to the movement of the steering column 11 is reduced to implement size reduction of the steering device 1 (see FIG. 1).

Embodiment 2

A steering column in embodiment 2 will be described.

Figure 5:
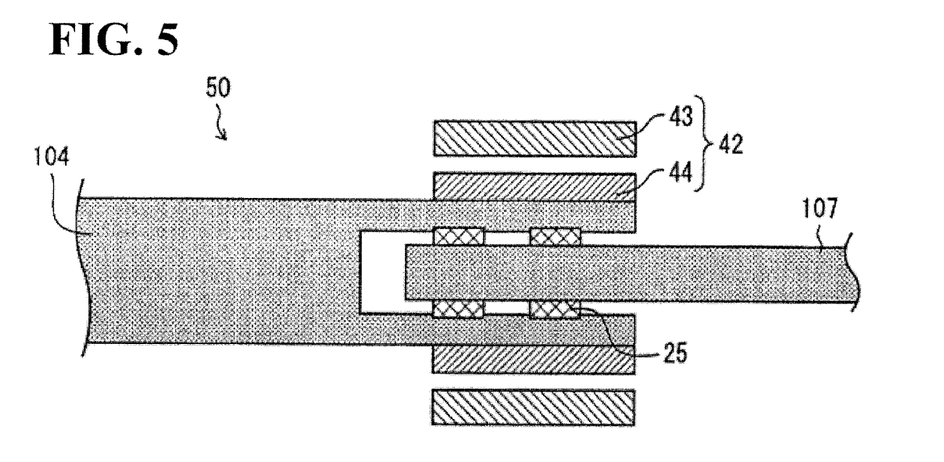
FIG. 5 is a cross-sectional view of a steering column according to embodiment 2, schematically illustrating an exemplary configuration of the steering column.

FIG. 5 is a cross-sectional view of the steering column 50 according to embodiment 2, schematically illustrating an exemplary configuration of the steering column 50. In embodiment 2, the steering column 50 has a configuration without a reduction gear such as the planetary support member 32 and the planetary gear 33 (see FIGS. 2A and 2B) in embodiment 1.

Specifically, in the steering column 50, the magnet 44 is coupled to the column shaft 104 through no reduction gear. That is, in embodiment 2, the column shaft 104 itself serves as the output shaft of the motor 42. In other words, in place of the transmitter 31 in embodiment 1, the steering column 50 includes a transmitter that is the output shaft of the motor 42 and transmits rotation of the output shaft to the column shaft 104 without reducing the rotation in speed.

As described above, even the configuration in which the steering column includes no reduction gear can produce the same effect as the configuration in embodiment 1.

Embodiment 3

A configuration of a column shaft and a lower steering shaft in embodiment 3 will now be described.

The column shaft 104 and the lower steering shaft 107 according to embodiment 1 may be splined. More specifically, a spline groove is formed in an inner surface of the column shaft 104. A spline groove is formed in an outer surface of the lower steering shaft 107 and fitted with the spline groove formed in the inner surface of the column shaft 104.

According to embodiment 3, the spline grooves are fitted with each other to prevent the column shaft 104 and the lower steering shaft 107 from relatively rotating about the axis.

After the engagement portions 25 are broken by a second collision to release the engagement between the column shaft 104 and the lower steering shaft 107, relative rotation about the axis is prevented while relative movement in the axial direction is allowed. Thus, even after the second collision, the steerability can be maintained.

Embodiment 4

An engagement portion in embodiment 4 will be described with reference to FIG. 6A. In place of the engagement portions 25 (see FIGS. 2A and 2B) formed of resin in embodiment 1 and embodiment 2 described above, the engagement portion according to embodiment 4 has the following configuration.

Figure 6A:
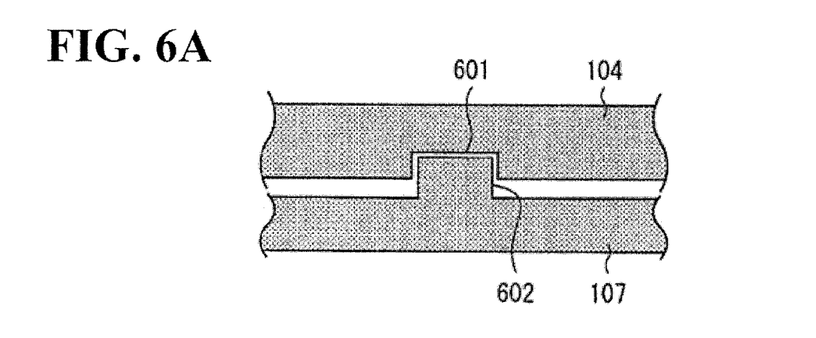
FIGS. 6A and 6B are diagrams respectively schematically illustrating exemplary configurations of engagement portions according to embodiment 4 and embodiment 5.

FIG. 6A is a diagram schematically illustrating an exemplary configuration of the engagement portion according to embodiment 4.

First, in a first configuration of the engagement portion according to embodiment 4, as illustrated in FIG. 6A, a recess 601 is formed in an inner surface of the column shaft 104. A protrusion 602 to engage with the recess 601 is formed on an outer surface of the lower steering shaft 107. The engagement between the recess 601 and the protrusion 602 is released when force of a predetermined magnitude or more that has a component in the axial direction of the column shaft 104 is received.

Even the configuration of such an engagement portion can produce the same effect as in embodiment 1 described above.

Embodiment 5

An engagement portion in embodiment 5 will be described with reference to FIG. 6B. In place of the engagement portions 25 (see FIGS. 2A and 2B) formed of resin in embodiment 1 and embodiment 2 described above, the engagement portion according to embodiment 5 has the following configuration.

Figure 6B:
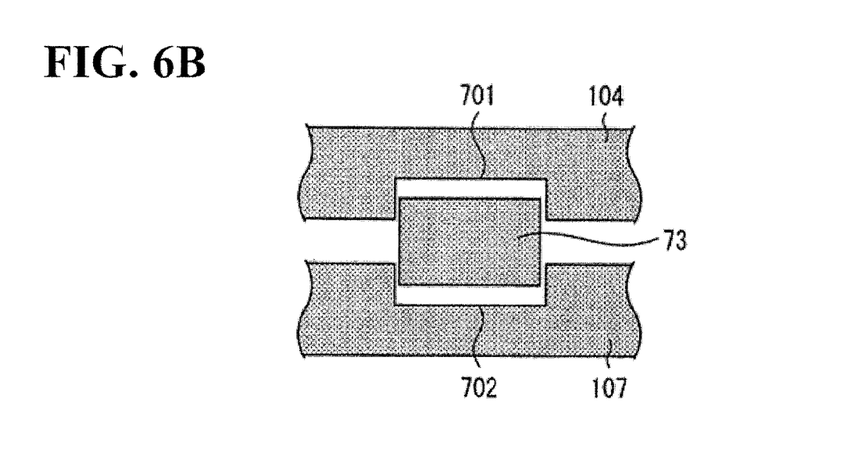

FIG. 6B is a diagram schematically illustrating an exemplary configuration of the engagement portion according to embodiment 5.

In the configuration of the engagement portion according to embodiment 5, as illustrated in FIG. 6B, a first recess 701 is formed in an inner surface of the column shaft 104 in the circumferential direction. A second recess 702 is formed in an outer surface of the lower steering shaft 107. Further, an annular or arcuate engagement member 73 is disposed to engage with each of the first recess 701 and the second recess 702. When the engagement member 73 receives force of a predetermined magnitude or more that has a component in the axial direction of the first steering shaft, the engagement of the engagement member 73 with each of the first recess 701 and the second recess 702 is released.

Even the configuration of such an engagement portion can produce the same effect as in embodiment 1.

There is a need for a reduction in size of the steering device itself, which includes the impact absorbing mechanism.

The embodiment reduces the size of the steering device including the impact absorbing mechanism.

Obviously, numerous modifications and variations of the present invention are possible in light of the above teachings. It is therefore to be understood that within the scope of the appended claims, the present invention may be practiced otherwise than as specifically described herein.

The invention claimed is:

1. A steering device comprising:
a motor;
a first shaft of a hollow cylindrical shape coupled in a torque transmittable manner to a steering member for a driver to performs steering operation;
a transmitter disposed on an outer circumference of the first shaft and configured to transmit torque of the motor to the first shaft;
a second shaft coupled in a torque transmittable manner to a wheel-turning unit configured to turn wheels, the second shaft being inserted in the first shaft; and
an engagement portion interposed between an inner surface of the first shaft and an outer surface of the second shaft and configured to make the first shaft and the second shaft engage with each other.

2. The steering device according to claim 1, wherein the transmitter comprises a reduction gear configured to reduce a speed of rotation of an output shaft of the motor and transmit the rotation to the first shaft.

3. The steering device according to claim 2, wherein the inner surface of the first shaft and the outer surface of the second shaft are splined.

4. The steering device according to claim 3, wherein the engagement portion is made of resin.

5. The steering device according to claim 3, wherein the engagement portion comprises a protrusion formed on one of the inner surface of the first shaft and the outer surface of the second shaft and a recess formed in another of the inner surface of the first shaft and the outer surface of the second shaft.

6. The steering device according to claim 2, wherein the engagement portion is made of resin.

7. The steering device according to claim 2, wherein the engagement portion comprises a protrusion formed on one of the inner surface of the first shaft and the outer surface of the second shaft and a recess formed in another of the inner surface of the first shaft and the outer surface of the second shaft.

8. The steering device according to claim 1, wherein the transmitter comprises an output shaft of the motor and is configured to transmit rotation of the output shaft to the first shaft without reducing a speed of the rotation.

9. The steering device according to claim 8, wherein the inner surface of the first shaft and the outer surface of the second shaft are splined.

10. The steering device according to claim 9, wherein the engagement portion is made of resin.

11. The steering device according to claim 9, wherein the engagement portion comprises a protrusion formed on one of the inner surface of the first shaft and the outer surface of the second shaft and a recess formed in another of the inner surface of the first shaft and the outer surface of the second shaft.

12. The steering device according to claim 8, wherein the engagement portion is made of resin.

13. The steering device according to claim 8, wherein the engagement portion comprises a protrusion formed on one of the inner surface of the first shaft and the outer surface of the second shaft and a recess formed in another of the inner surface of the first shaft and the outer surface of the second shaft.

14. The steering device according to claim 1, wherein the inner surface of the first shaft and the outer surface of the second shaft are splined.

15. The steering device according to claim 14, wherein the engagement portion is made of resin.

16. The steering device according to claim 14, wherein the engagement portion comprises a protrusion formed on one of the inner surface of the first shaft and the outer surface of the second shaft and a recess formed in another of the inner surface of the first shaft and the outer surface of the second shaft.

17. The steering device according to claim 1, wherein the engagement portion is made of resin.

18. The steering device according to claim 1, wherein the engagement portion comprises a protrusion formed on one of the inner surface of the first shaft and the outer surface of the second shaft and a recess formed in another of the inner surface of the first shaft and the outer surface of the second shaft.

19. The steering device according to claim 1, wherein the engagement portion comprises an engagement member of an annular or arcuate shape configured to engage with a first recess and a second recess, the first recess being formed in the inner surface of the first shaft in a circumferential direction, the second recess being formed in the outer surface of the second shaft in a circumferential direction.

20. The steering device according to claim 1, further comprising:
 a housing configured to accommodate at least the first shaft; and
 a support member configured to support the housing, the support member being configured to displace the housing at least in an axial direction of the first shaft when the housing receives a force in the axial direction of the first shaft.

* * * * *